United States Patent Office 2,977,654
Patented Apr. 4, 1961

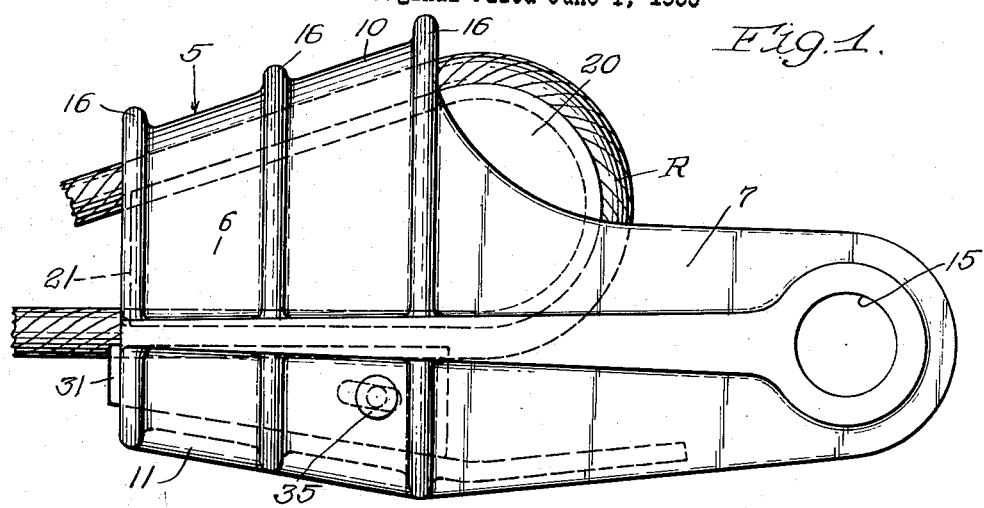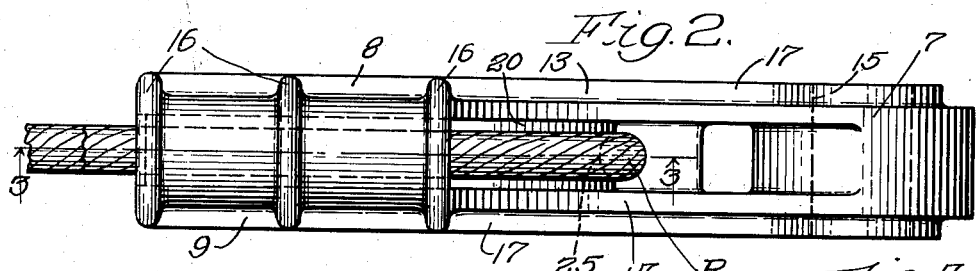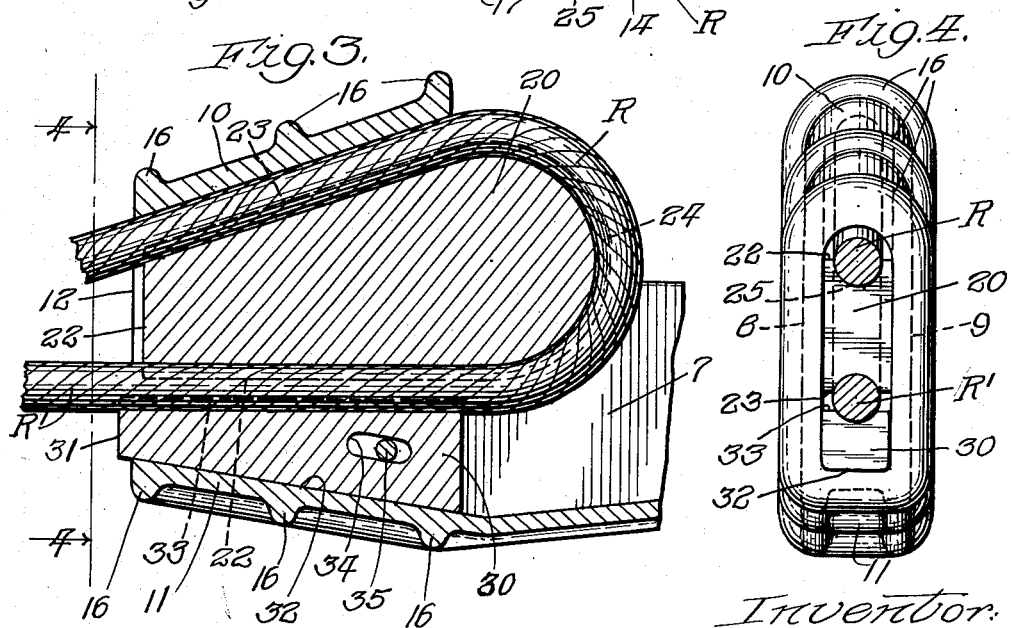

2,977,654
ROPE WEDGE SOCKET

John W. Page, Chicago, Ill., assignor to Page Engineering Company, a corporation of Illinois Continuation of abandoned application Ser. No. 512,370, June 1, 1955. This application Dec. 2, 1957, Ser. No. 700,043

4 Claims. (Cl. 24—126)

This invention relates to a device for gripping a rope and more particularly to a wedge and socket type of device for obtaining a grip upon a wire rope or similar flexible cable-like member. This application is a continuation of my copending application, Serial No. 512,370, filed June 1, 1955, and now abandoned.

The standard wedge socket connections for cables that have been used for some time include a socket in which a single wedge may be moved longitudinally to pinch a wire rope or the like between the wedge and the socket. The pinching action makes possible a very tight grip which will not slip provided that the included angle between the sides of the wedge is sufficiently small. Unfortunately, the smaller the angle between the sides of the wedge, the tighter the grip and the more difficult it is to remove the wedge from its socket when it is desired to release the device from the rope.

The present invention relates to an improved wedge socket for gripping a wire rope or the like. One particular application is in earth moving equipment such as dragline cranes in which the wire rope involved varies in size up to 3 inches in diameter. Of course, the sockets and the wedges are in dimensions proportionate to the size of the wire rope involved.

The present invention provides a structure wherein the wire rope may be gripped quite securely and yet easily released whenever it is desired to change the gripping structure. In the past, a single wedge was provided with a peripheral groove about which the wire rope was wrapped so that the rope would extend into the socket and come back through the socket around the wedge itself. This structure is retained in the present invention, however, there is added an auxiliary wedge part having a very narrow included angle between its sides so that it may cooperate with the main wedge about which the rope is wrapped. By this structure, a secure grip is provided on the rope and yet at the same time one which can be easily released.

It is therefore the principal object of this invention to provide a new and improved rope gripping device.

A further object is to provide a rope gripping device of the character described which has structure permitting a ready and easy release of the grip of the device upon the rope.

A further object is to provide a wire rope gripping device for large size ropes while maintaining the size of the device at a minimum.

Other objects, features and advantages of the present invention will be apparent from the following description of a preferred embodiment illustrated in the drawings in which:

Figure 1 is a side elevational view of the rope gripping device of this invention fragmentarily showing a wire rope gripped therein;

Figure 2 is a top plan view of the device illustrated in Figure 1;

Figure 3 is a fragmentary sectional view through the device taken substantially along line 3—3 in Figure 2; and Figure 4 is a sectional view taken from the lefthand end of Figure 3 taken substantially along line 4—4.

In a dragline excavator, a relatively large bucket is suspended upon a large size cable which may be attached to the bucket at the outer end of the cable. While chains may be used adjacent the bucket itself, ordinarily the hoisting mechanism employs a cable which has to be connected to the bucket. In such instances, a wire rope wedge socket connection is ordinarily used.

The present invention, as illustrated in the drawings, is concerned with a wedge socket of the type which may be used in earth moving or excavating equipment.

As illustrated in the drawings, a housing, generally indicated 5, has a socket portion 6 and an eye portion 7 at opposite ends. In the larger sizes, this one-piece housing is cast of high manganese bearing steel. In smaller sizes it may be of ordinary carbon steel or another alloy steel.

The socket portions 6 has sidewalls 8 and 9 (Fig. 2) which are joined by endwalls 10 and 11 (Fig. 3) arranged in diverging relation from an open outer end 12 of the socket portion. Sometimes the socket portion 6 is referred to as a basket for the wedges. The sidewalls 8 and 9 are generally parallel and closer together than the endwalls 10 and 11. The sidewalls also have extensions 13 and 14 respectively which are joined at their outer ends to form the eye portion 7 through which bore 15 extends so that a clevis pin or other connecting structure can be secured to the wedge socket. For strengthening purposes, ribs 16 are formed integrally upon the body of the wedge socket and extend around it. Lengthwise of the housing, a horizontal rib 17 extends between the socket portion and the eye portion for additional strengthening in a longitudinal direction.

As in the previous structures used for connection to a wire rope, a relatively large wedge is used about which the wire rope may extend. The size of this wedge is determined primarily by the sharpness of the bend which may be put into the particular wire rope. A similar structure is retained in the present device in the relatively large wedge 20. This wedge has a blunt end 21 near the front end of the socket, one sidewall or wedge surface 22 positioned adjacent the interior of the wedge socket, an opposite sidewall or wedge surface 23 positioned to ride adjacent and parallel to the sidewall 10 of the wedge socket and a rounded rearward end 24 joining the sidewalls. The wedge surfaces 22 and 23 as well as the rounded surface of the wedge are grooved as indicated by the semicircular form of surface 25 illustrated in Figure 2 so that the wire rope R may be received in the grooves in the operative surfaces of the wedge 20. The included angle between the wedge surfaces 22 and 23 is generally made less than would be the case should a single wedge such as 20 be used in the wedge socket to secure the wire rope in place.

In the present invention an auxiliary wedge 30 is employed within the socket portion or basket 6. This smaller wedge has one wedge surface 32 abutting against the endwall 11 and an opposite wedge surface 33 grooved to receive a wire rope R. The two wedges 20 and 30 are positioned side by side within the wedge socket or basket and cooperatively span the distance between the endwalls 10 and 11. As illustrated in Figures 3 and 4, a pull on the rope portion R′ which is the main line to which the socket is connected will force both wedges 20 and 30 to the left or toward a pinching relation upon the rope. The included angle between the wedge surfaces 32 and 33 of the small wedge 30 is considerably less than the included angle between the gripping surfaces of the larger wedge.

It has been found that if the main line of the rope is led in between the wedges and the free end taken between the wedge surface 23 and endwall 10 of the unit it is very easy to dislodge the wedges from the socket by a light tap either upon the outer end 31 of the small wedge or upon the outer end 22 of the larger. It is thought that the two wedges 20 and 30 act together as a single wedge because the included angle of the two wedges taken together is considerably greater than the included angle of either single wedge. Under such construction, it has been found that a light tap with a hammer on either wedge will produce enough slack so that the wedges may be released and the rope removed. It has also been found that should the rope be led in between the larger wedge and the socket wall 10 and the free end brought between the two wedges, substantially more than twice the force is required to release the rope from the socket.

As previously mentioned, the large wedge is determined in size primarily by the size of the rope with which it is to be used. The smaller wedge 30, however, is made with a very small included angle in order to keep the size of the basket at a minimum. Additionally, for convenience in handling, the small wedge is provided with an elongated slot 34 through which a rivet 35 is passed and clinched into the sidewalls 8 on either side of the basket. The slot 34 is sufficient in length to permit movement of the small wedge and yet retains it in place within the basket against accidental removal. The slot 34 is made of such a size that no interference with the pinching action on the wire rope is caused by restricting movement of the small wedge nor any restriction upon the release of the rope.

Prior to the use of the herein described structure, large wedge sockets have generally been removed from a dragline bucket by burning off the cable permitting the socket to be taken into a shop for removal of the cable fragment left in the socket. Ordinarily, the cable fragment was so tightly held in the socket that considerable work was required to remove it. The present socket can be loosened in the field with a small hammer even when used with 2 and 3 inch cables. Experience has taught that the fact that the pull line R' is between the wedges permits this action of the socket.

While I have shown and described a preferred embodiment of my invention, it is to be understood that it is capable of many modifications. Changes, therefore, in the construction and arrangement may be made without departing from the spirit and scope of the invention as disclosed in the appended claims.

I claim:

1. A device for gripping a wire rope, comprising: a tapered hollow housing open at one end; a pair of wedges slidable within the housing toward the open end to cooperatively wedge in tandem across the housing, said wedges being juxtaposed and each having a side bearing on the load bearing rope portion passing therebetween, one wedge having another side bearing against a nonload bearing portion of the rope extending around said one wedge to lie between the abutting housing and said another wedge side, the other wedge having another side directly abutting the housing and having an included angle between its sides less than the included angle between the side of said one wedge, said other wedge having an exposed part exterior of the housing for receiving a blow to move said other wedge independently of said one wedge for loosening the grip of the wedges and housing on the rope.

2. A device for gripping a wire rope, comprising: a tapered hollow housing open at one end; a pair of wedges slidable in the housing toward the open end to cooperatively wedge in tandem across the housing, one of the wedges being larger than the other and having angularly disposed straight side portions joined by a rounded portion for receiving the rope wrapped therearound, and the other smaller wedge having non-parallel straight sides with an included angle between the sides substantially less than the included angle between the sides of said one wedge, said larger and smaller wedges having their juxtaposed sides shaped to pinch upon a load carrying rope portion therebetween with the smaller wedge opposite side directly engaging a wall of the housing to facilitate loosening of the wedges in the housing when said wedge straight sides are juxtaposed against the load carrying portion of the rope positioned therebetween while the remaining side of said smaller wedge abuts the housing and the remaining side of said larger wedge bears against the rope wrapped about said one wedge with the rope wedged against the housing.

3. A wedge socket for gripping a rope, comprising: a hollow housing having a socket portion at one end and an attaching eye portion at the opposite end, said socket portion having generally parallel side walls joined by end walls diverging from an open outer end, said side walls extending from the socket portion to the eye portion forming an integral housing; a pair of wedges each slidingly positioned between the side walls within the socket portion and having diverging wedge surfaces, said wedges being arranged side by side between the diverging end walls of the socket portion with adjacent opposed wedge surfaces being straight and generally parallel and meeting along a line which passes through said attaching eye portion, said straight parallel wedge surfaces being adapted to pinch upon the load carrying rope portion entering the socket and the included angle between the diverging wedge surfaces of one of said wedges being larger than the included angle between the diverging wedge surfaces of the other wedge, said larger one wedge having the free end of the rope wrapped therearound with the free end of the rope held between an end wall of the socket and said one wedge, said smaller other wedge having its wedge surface opposite said straight parallel wedge surface abutting an end wall of the socket to aid in removal of a rope passed with its load carrying portion first between the wedges and in turn around said one wedge in pinched relation within the socket portion, said other wedge having a portion exposed to receive a blow for moving said other wedge and initiating loosening of the wedges on the rope.

4. A wedge socket for gripping a rope, comprising: a hollow housing having a socket portion at one end and an attaching eye portion at the opposite end, said socket portion having generally parallel side walls joined by end walls diverging from an open outer end, said side walls extending from the socket portion to the eye portion forming an integral housing; a pair of wedges each slidingly positioned between the side walls within the socket portion and having diverging wedge surfaces, said wedges being arranged side by side between the end walls of the socket portion with adjacent wedge surfaces being straight and generally parallel and lying along a line which passes through said attaching eye portion, said straight parallel wedge surfaces engaging a load carrying rope portion between them to hold the load carrying rope portion in alignment with said eye portion, and the included angle between the diverging wedge surfaces of one of said wedges being larger than the included angle between the diverging wedge surfaces of the other wedge to aid in removal of a rope passed with its load carrying portion between the wedges and its free end in turn around said one wedge and in pinched relation against an end wall of the socket portion by said one wedge, said other wedge having a portion exposed to receive a blow for moving said other wedge and initiating loosening of the wedges on the rope.

References Cited in the file of this patent

UNITED STATES PATENTS

| 1,048,928 | Aster et al. | Dec. 31, 1912 |
| 1,622,110 | Haworth | Mar. 22, 1927 |